US009665588B2

(12) United States Patent
MacLaurin

(10) Patent No.: US 9,665,588 B2
(45) Date of Patent: May 30, 2017

(54) QUERY-BASED NOTIFICATION ARCHITECTURE

(75) Inventor: Matthew B. MacLaurin, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 277 days.

(21) Appl. No.: 12/784,884

(22) Filed: May 21, 2010

(65) Prior Publication Data

US 2010/0228778 A1    Sep. 9, 2010

Related U.S. Application Data

(63) Continuation of application No. 11/079,123, filed on Mar. 14, 2005, now Pat. No. 7,747,556.

(60) Provisional application No. 60/657,535, filed on Feb. 28, 2005.

(51) Int. Cl.
*G06F 17/30*     (2006.01)
*G06F 11/30*     (2006.01)

(52) U.S. Cl.
CPC ...... *G06F 17/30144* (2013.01); *G06F 11/302* (2013.01); *G06F 11/3079* (2013.01); *Y10S 707/99933* (2013.01)

(58) Field of Classification Search
CPC ......... G06F 17/30067; G06F 17/30575; G06F 17/30212
USPC ........................................................ 707/634
See application file for complete search history.

(56) References Cited

U.S. PATENT DOCUMENTS

| 6,003,034 | A  | * | 12/1999 | Tuli ................. G06F 17/30067 |
| 6,473,751 | B1 | * | 10/2002 | Nikolovska et al. |
| 6,654,751 | B1 | * | 11/2003 | Schmugar et al. |
| 6,832,224 | B2 | * | 12/2004 | Gilmour |
| 2002/0087649 | A1 | * | 7/2002 | Horvitz ................ G06Q 10/107 709/207 |

(Continued)

FOREIGN PATENT DOCUMENTS

| JP | 2003150438 | 5/2003 |
| JP | 2003216636 | 7/2003 |

(Continued)

OTHER PUBLICATIONS

Translated Japanese Office Action mailed Oct. 7, 2011 for Japanese Patent Application No. 2006-052067, a counterpart foreign application of U.S. Pat. No. 7,747,556, 6 pages.

(Continued)

*Primary Examiner* — Belix M Ortiz Ditren
(74) *Attorney, Agent, or Firm* — Lee & Hayes, PLLC

(57) ABSTRACT

A data repository monitoring system that utilizes queries to generate notifications in response to the identification of new and changed content. The system includes a monitoring component that monitors a plurality of disparate repositories in order to identify the receipt of new or modified content. The monitoring component includes a query component(s) that identifies metadata of imported content. The query can be generated and communicated to the monitoring component via a graphical user interface. A notification component is also provided to generate a prompt upon the receipt of incoming content as identified by the query component. The invention employs a centralized store (e.g., change queue) that maintains metadata corresponding to imported (e.g., new) metadata.

20 Claims, 10 Drawing Sheets

(56) References Cited

U.S. PATENT DOCUMENTS

| | | | |
|---|---|---|---|
| 2003/0046292 A1 | 3/2003 | Subramanian et al. | |
| 2003/0177412 A1* | 9/2003 | Todd | 714/25 |
| 2003/0204586 A1* | 10/2003 | Schnetzler | 709/224 |
| 2004/0153343 A1* | 8/2004 | Gotlib et al. | 705/3 |
| 2005/0033777 A1 | 2/2005 | Moraes et al. | |
| 2006/0085412 A1* | 4/2006 | Johnson | G06F 17/30566 |
| 2009/0171625 A1* | 7/2009 | Razdow | 702/187 |

FOREIGN PATENT DOCUMENTS

| | | |
|---|---|---|
| JP | 2004005500 | 1/2004 |
| JP | 2004334428 | 11/2004 |
| WO | WO0142988 A2 | 6/2001 |
| WO | WO2004100020 A2 | 11/2004 |

OTHER PUBLICATIONS

Translated Japanese Office Action mailed Mar. 16, 2012 for Japanese Patent Application No. 2006-052067, a counterpart foreign application of U.S. Pat. No. 7,747,556, 4 pages.

EP Search Report dated Apr. 11, 2006; mailed Apr. 10, 2006; EP Patent Application Serial No. 06 10 1025; 8 pages.

* cited by examiner

QUERY-BASED NOTIFICATION ARCHITECTURE

CROSS-REFERENCE TO RELATED APPLICATION(S)

This patent application is a continuation application of co-pending, commonly owned U.S. patent application Ser No. 11/079,123, filed on Mar. 14, 2005, and entitled "QUERY-BASED NOTIFICATION ARCHITECTURE" now U.S. Pat. No. 7,747,556. The entire contents of the application are hereby incorporated herein by reference. Furthermore, U.S. patent application Ser. No. 11/079,123 claims the benefit of U.S. Provisional Patent Application Ser. No. 60/657,535 filed on Feb. 28, 2005, and entitled "QUERY-BASED NOTIFICATION ARCHITECTURE."

TECHNICAL FIELD

This invention is related to computer systems and more particularly to a system and methodology that facilitates monitoring disparate data repositories with respect to new and/or modified content.

BACKGROUND OF THE INVENTION

As reliance upon computers becomes increasingly more commonplace, the task of managing data received, generated, modified and/or deleted is greatly enhanced. Frequently a computer user accesses a variety local and shared file systems in connection with a number of utility, entertainment and communication applications (e.g., email accounts, content download sources). With the technological advances and increased reliance upon computing systems, and more particularly in the organization and management of content related to a large number of repositories, there is an ongoing and increasing need to monitor content activity with respect to these repositories. Additionally, there is a substantial need to generate a notification in response to a change in content of these multiple repositories.

Today, computer users often have to manage a variety of content (e.g., photos, email) received from and maintained within many different sources. For example, a user must manage and organize content in accessible local file systems, shared filed systems, multiple email accounts and the like. In order to maintain effective monitoring of these repositories, it would be helpful for the user to receive a prompt upon the arrival and/or change in content. This prompt could be particularly useful to monitor sources including, but not limited to, the World Wide Web, a network "share", email account(s), or a local machine.

Conventional email applications provide a limited model for monitoring the arrival of new email content. For example, email systems notify a user of newly received content. However, these conventional systems are limited in that they do not address other types of data arrival and/or modification. Today, a particular email system is limited to only notify a user of the arrival of an email within the particular email application.

Accordingly, there is a need for a more centralized system that can provide notifications of receipt and/or modification of content across a user accessible file system and corresponding applications. Furthermore, there is a need for generating these notifications in response to data changes on multiple user machines thereby centralizing delivery of such notifications.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, is directed to a novel system that facilitates monitoring data. The system includes a monitoring component that can monitor a plurality of disparate repositories in order to identify the receipt of new and/or modified content. The invention employs a centralized store (e.g., change queue), which maintains metadata corresponding to imported (e.g., new) metadata. In accordance thereto, an extensible system for importing and monitoring data from external sources is provided.

Aspects of the subject invention include a mechanism that enables users to construct queries against imported metadata. These queries can be labeled as "important" thus designating them as "standing queries." A standing query can monitor a designated repository (or group of repositories) as defined by the user. A user interface (e.g., graphical user interface) can be employed to assist in designating "standing queries." By way of example, once a query is constructed, a user can drag an icon which represents the query onto a "notification bar" thereby automatically designating the query as a standing query. Once designated, the standing query can monitor incoming metadata in relation to the subject repository. A notification can be generated when the "important" or "standing query" is matched to new or changed metadata. Additionally, the subject invention provides for a mechanism that transmits metadata changes between devices (e.g., personal computers).

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
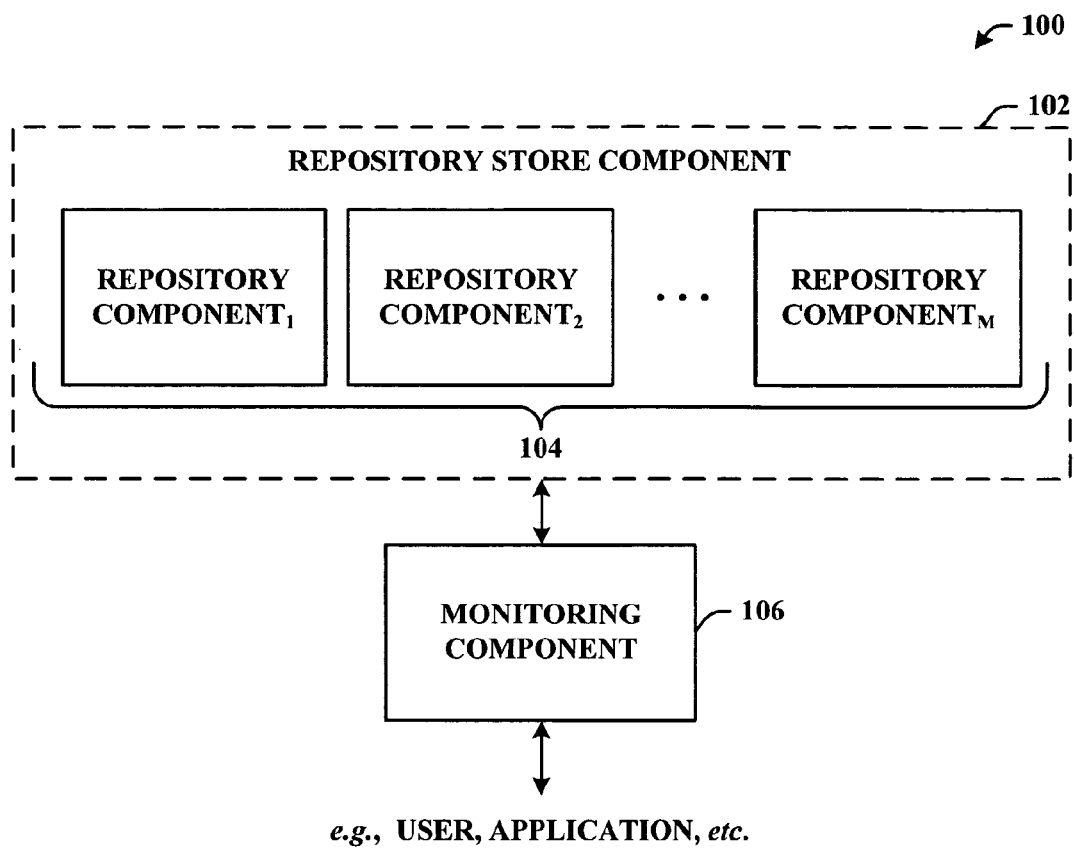
FIG. 1 illustrates a general component block diagram of a system that monitors multiple repositories in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

An extensible system for importing data from external sources and for monitoring the data received is provided. More particularly, the subject invention provides a novel system and methodology to monitor content activity with respect to a repository (or group of disparate repositories). The invention can employ a centralized store to maintain metadata relating to imported content. In accordance with aspects of the invention, queries can be constructed against imported and/or received metadata. Additionally, queries can be designated as "important" whereby a notification can be generated when an "important" query is matched to new or changed metadata. In order to accomplish the forgoing, the subject invention provides for a mechanism for transmitting metadata changes between devices (e.g., machines).

Referring now to FIG. 1, there is illustrated a schematic representation of an aspect of a system 100 that facilitates query-based notification in accordance with the subject invention. Generally, the system 100 can include a repository store component 102 having repository components 104 therein. Further, the system 100 can employ a monitoring component 106 that monitors the activity and content of the individual repositories 104 within the repository store component 102.

The repository store component 102 can include 1 to M repository components, where M is an integer. Repository components 1 to M can be referred to collectively or individually as repository components 104 as illustrated. In accordance with aspects of the subject invention, repository component(s) 104 can be any repository capable of maintaining data and/or information. By way of example, repository component(s) 104 can include, but are not intended to be limited to, local file stores, shared file stores, email applications, websites or the like.

The monitoring component 106 can monitor the content and activity of the repository components 104. By way of example, the monitoring component 106 can identify the receipt of new content into the repository components 104. In accordance thereto, the monitoring component 106 can effect a desired prompt and/or notification. For instance, upon receipt of an email communication via a user personal email application, the monitoring component 106 can generate a specialized notification thereby alerting the user of such receipt. Likewise, if an email communication is received via a disparate email application, the monitoring component 106 can generate a different specialized notification thereby alerting the user of such receipt.

By way of further example, in alternate aspects, the monitoring component 106 can be configured with a decision-making mechanism (e.g., logic) in the form of a rule engine whereby a rule can be applied to the monitoring component 106 thus effecting operations in accordance with the rule. In an alternate embodiment, an artificial intelligence (AI) component can be employed individually or in combination with other evaluation and/or logic-based schemes in connection with the operation of the monitoring component 106. These alternative aspects will be described in greater detail with respect to FIGS. 5 and 6 infra.

Figure 2:
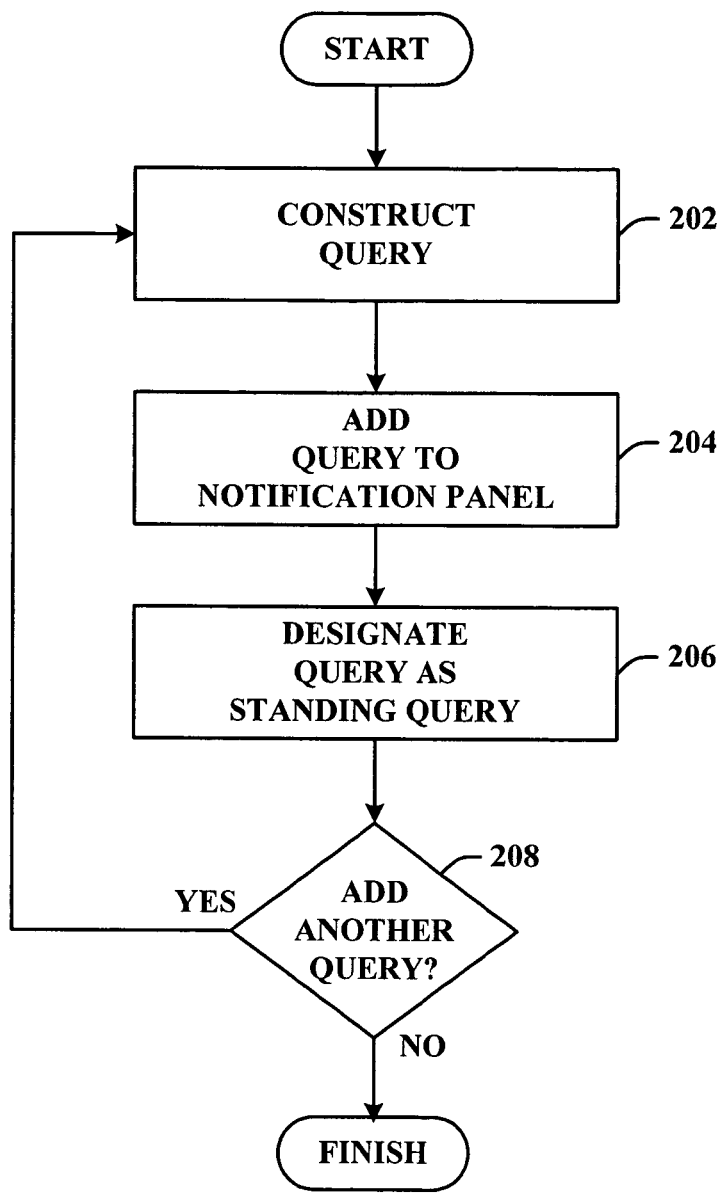
FIG. 2 illustrates an exemplary flow chart of procedures to create and designate a standing query in accordance with a disclosed aspect.

With reference to FIG. 2, there is illustrated a flowchart in accordance to an aspect of the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Referring to FIG. 2, at 202, a query is constructed. By way of example, a query can be constructed to identify content received from a particular source. In another example, a query can be constructed to identify content of a particular type (e.g., music) generated by a particular author (e.g., artist) or of a particular genre. It is to be appreciated that defining a query can be extremely simple or very complex. In other words, the query can be based upon one matching condition, such as "all email received from Matt." Additionally, the query can be based on multiple conditions, such as "all email received from Matt between the dates of Jun. 12, 2004 and Jun. 17, 2004."

At 204, the query can be added to a notification panel or other designated staging area. In one aspect, the notification panel can be any designated location identified in a user interface (UI). For example, a lower portion of the graphical user interface (GUI) can be designated as such a staging area. Once placed into the staging area, the query is designated as a standing query at 206.

At 208, a determination is made if another query is to be added to the notification panel (e.g., staging area). If another query is desired, the system returns to 202 to construct the additional query. On the other hand, if an additional query is not desired, the methodology finishes as illustrated. It will be understood that once an additional query is placed upon the notification panel and/or staging area, the system can monitor all of the subject queries and generate content change notifications accordingly. This process can be better understood with reference to the figures that follow.

Figure 3:
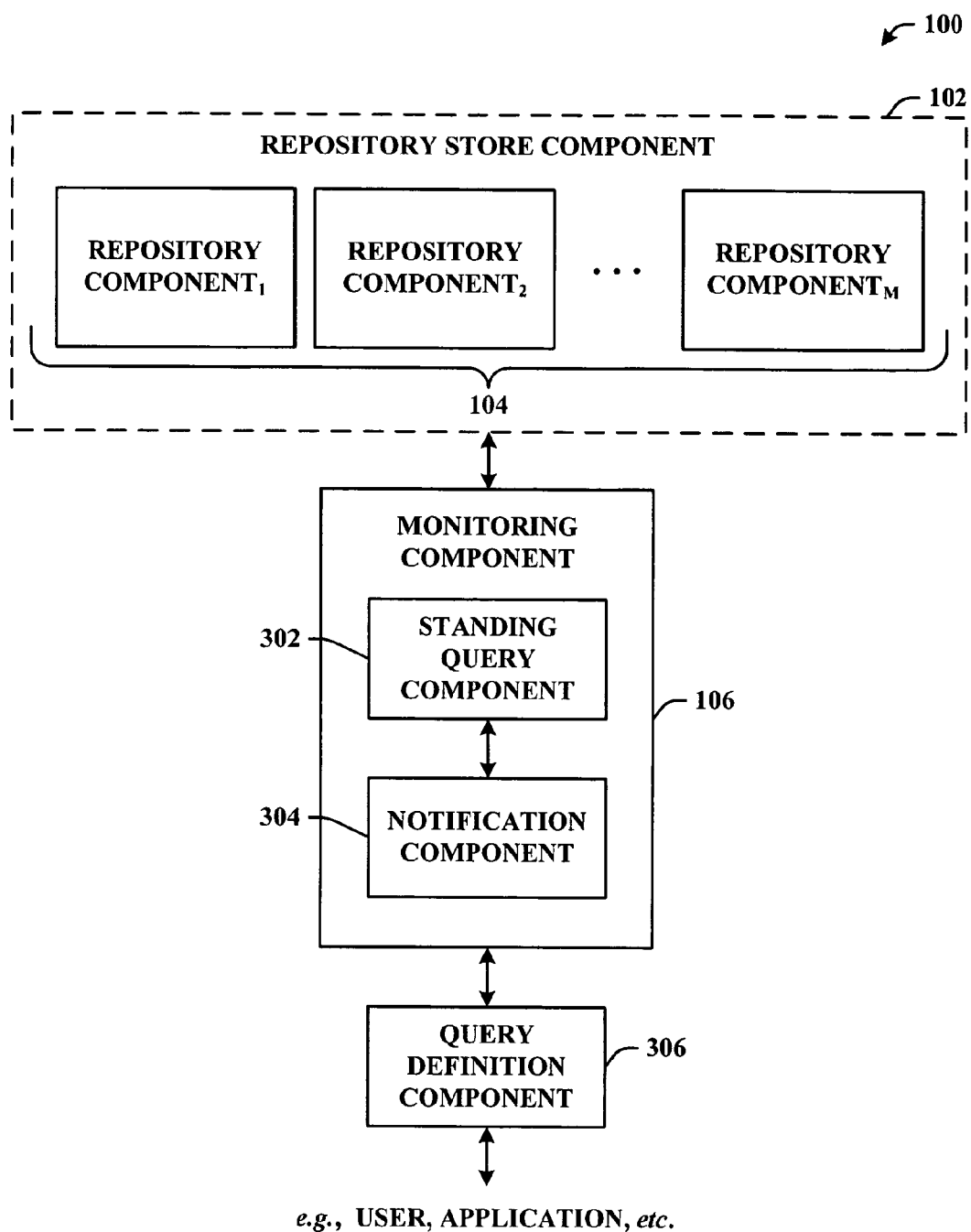
FIG. 3 illustrates a general component block diagram of a system having a query definition component, a standing query component and a notification component in accordance with an aspect of the subject invention.

With reference now to FIG. 3, a system that facilitates monitoring one or more repository components 104 is shown. As illustrated, the monitoring component 106 can include a standing query component 302 and a notification component 304. The standing query component 302 can be employed to monitor (e.g., query) metadata related to newly received (e.g., imported) and/or modified content. As well, the standing query component 302 can be designated to correspond to a particular and/or multiple repository components 104. It will be appreciated that the standing query component 302 can be constructed by a user and/or application. Furthermore, although a single standing query component 302 is illustrated in FIG. 3, it is to be understood that the monitoring component 106 can employ multiple standing query components that correspond to common and/or disparate repository components 104. In other words, the subject invention can facilitate monitoring and/or managing content with respect to a plurality of disparate repositories via multiple standing query components 302.

The standing query component can be generated via a query definition component 306. It is to be appreciated that the query definition component 306 can employ any known technique to effect definition of the query. By way of example, the query definition component 306 can employ graphical interactive techniques whereby iconic representations are manipulated thus generating the query. It will be appreciated that the query definition component 306 can include or be used in connection with a GUI to facilitate interactively generating the query.

The notification component 304 can be employed to alert of a change in content as defined by a particular standing query component 302. By way of example, suppose the standing query component 302 corresponds to a personal email account. Particularly, suppose the standing query component 302 is defined to identify "all new email received from Matt." Upon receipt of new content in the email account from "Matt", the notification component 304 can alert a user accordingly. It will be appreciated that the notification component 304 can employ any type of alert including, but not limited to, visual and/or audible alerts. Additionally, the notification component 304 can be employed to alert and/or trigger an application in response to a change in content corresponding to additional repository components 104.

Figure 4:
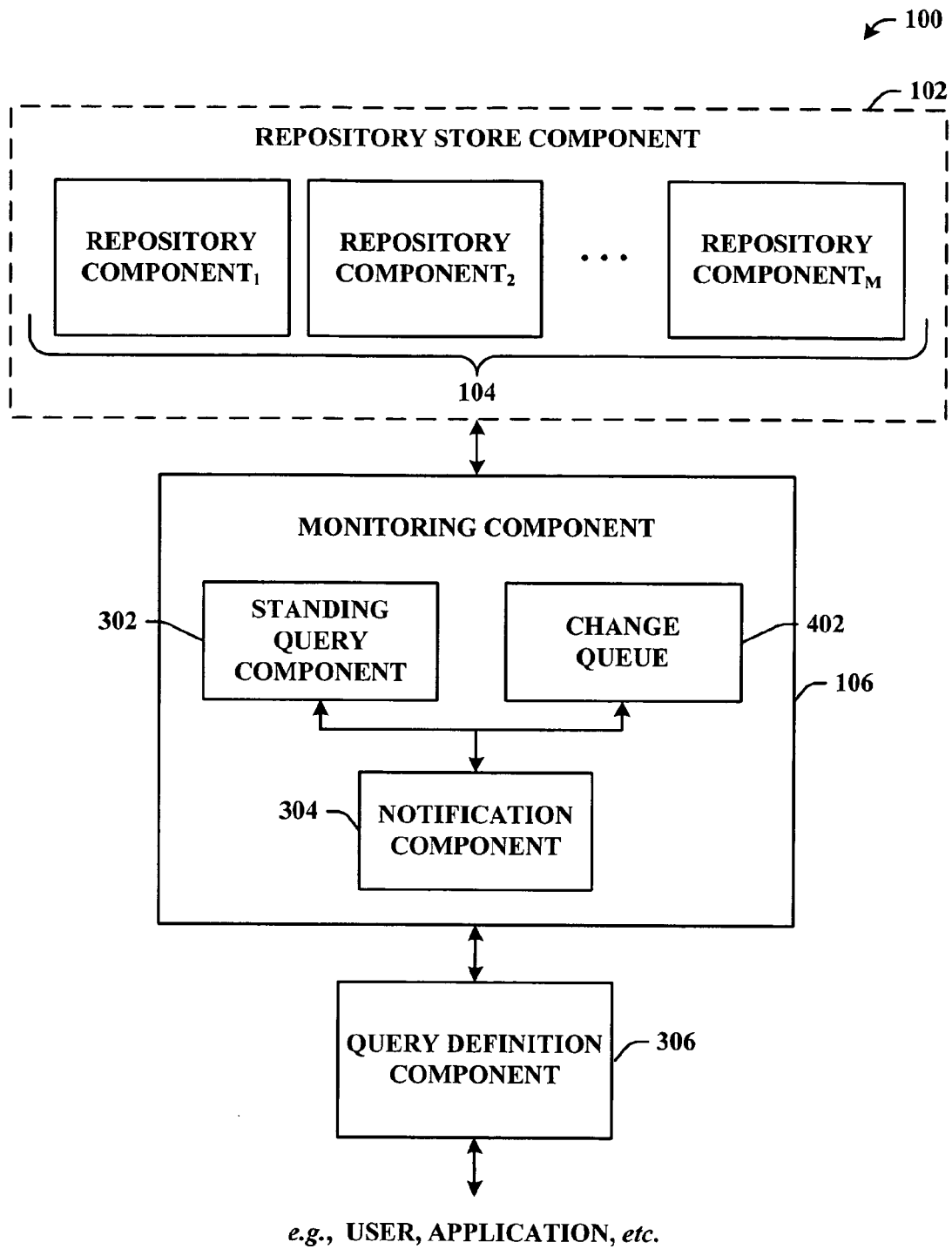
FIG. 4 illustrates a general component block diagram of a system that employs a change queue to effect maintaining metadata of imported content in accordance with an aspect of the subject invention.

Referring now to FIG. 4, a more detailed schematic view of a monitoring component 106 is shown. In particular, monitoring component 106 can employ a standing query component 302, a notification component 304 and a metadata store or change queue 402. The change queue 402 can maintain metadata corresponding to newly received and/or modified content relating to the repository components 104. Although the change queue 402 is illustrated as being integral to the monitoring component, it is to be understood that the change queue 402 can be deployed in any desired location without departing from the spirit and/or scope of the subject invention. For example, in an alternate aspect, the functionality of the change queue 402 can be integral to the repository store component 102 and/or integral to specific repository components 104. In yet another aspect, the change queue 402 can be located as a standalone storage device and/or memory device.

In operation, metadata from imported content can be extracted and maintained in the change queue 402. Accordingly, the monitoring component 106 can employ the standing query component 302 to interrogate the change queue 402 to identify content (e.g., metadata) that satisfies the standing query. Upon detection of satisfying metadata, the notification component 304 can be employed to generate an alert as described supra.

Figure 5:
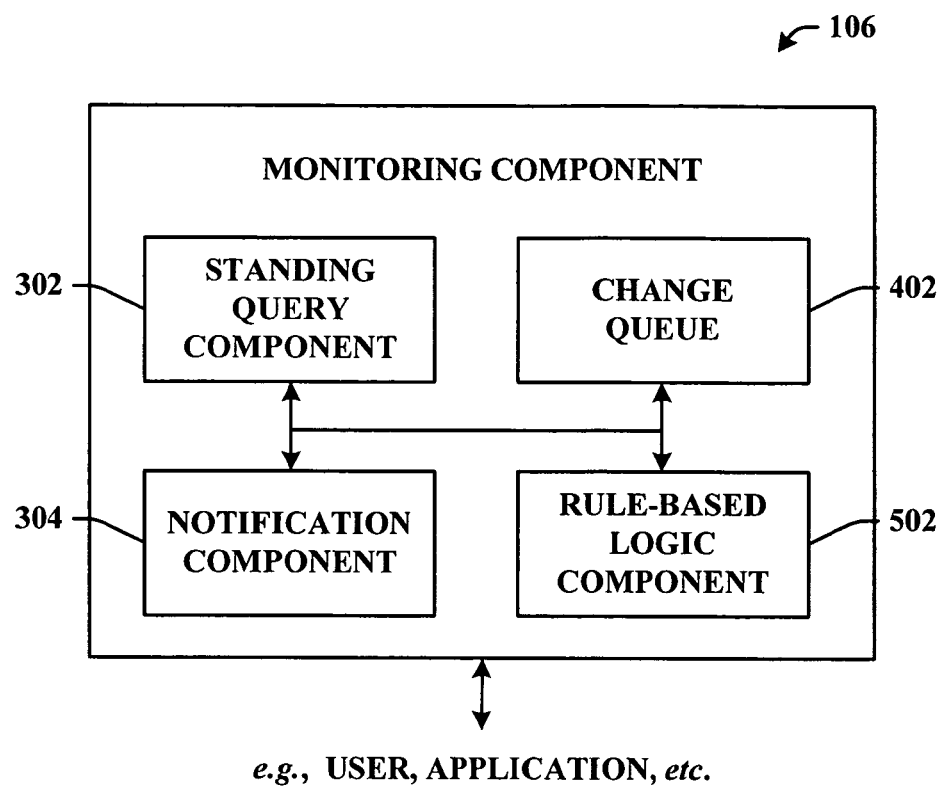
FIG. 5 illustrates a general component block diagram of an alternative monitoring component that employs rule-based logic in accordance with an aspect of the subject invention.

With reference now to FIG. 5, an alternate aspect of monitoring component 106 is shown. More particularly, monitoring component 106 can include a rule-based logic component 502 in addition to the standing query component 302, notification component 304 and change queue 402 described above. In accordance with this alternate aspect, an implementation scheme (e.g., rule) can be applied in connection to the functionality of the monitoring component 106. It will be appreciated that the rule-based implementation can facilitate automatic definition and/or implementation of standing query component 302 with respect to a repository component 104. In one aspect, the rule-based implementation can function as a filter and select data component(s) included within the result(s) generated by the standing query component 302 by employing a predefined and/or programmed rule(s) based upon any desired criteria (e.g., file type, file size, hardware characteristics).

By way of example, a user can establish a rule that can implement a query of a preferred type of file (e.g., music). In this exemplary aspect, the rule can be constructed to select all new or modified music files located in a targeted data store or source location. Accordingly, a result set of data components can be obtained, previewed and/or manipulated as desired. It will be appreciated that any of the specifications and/or criteria utilized in accordance with the subject invention can be programmed into a rule-based implementation scheme.

In the exemplary aspect of FIG. 5, the rule-based logic component 502 can be programmed or configured in accordance with any user-defined preference. For example, a rule can be established in accordance with a specific hardware configuration. By way of further example, a rule can be constructed in accordance with specific memory capacity of a device. In other words, as previously discussed, a rule can be established to take into consideration the specific limitations of a hardware device (e.g., memory and/or storage capacity). Thus, in one aspect, if a specific handheld device has low memory capacity, a rule can be generated to ignore and not notify a user of new content that exceeds a predefined size threshold.

Figure 6:
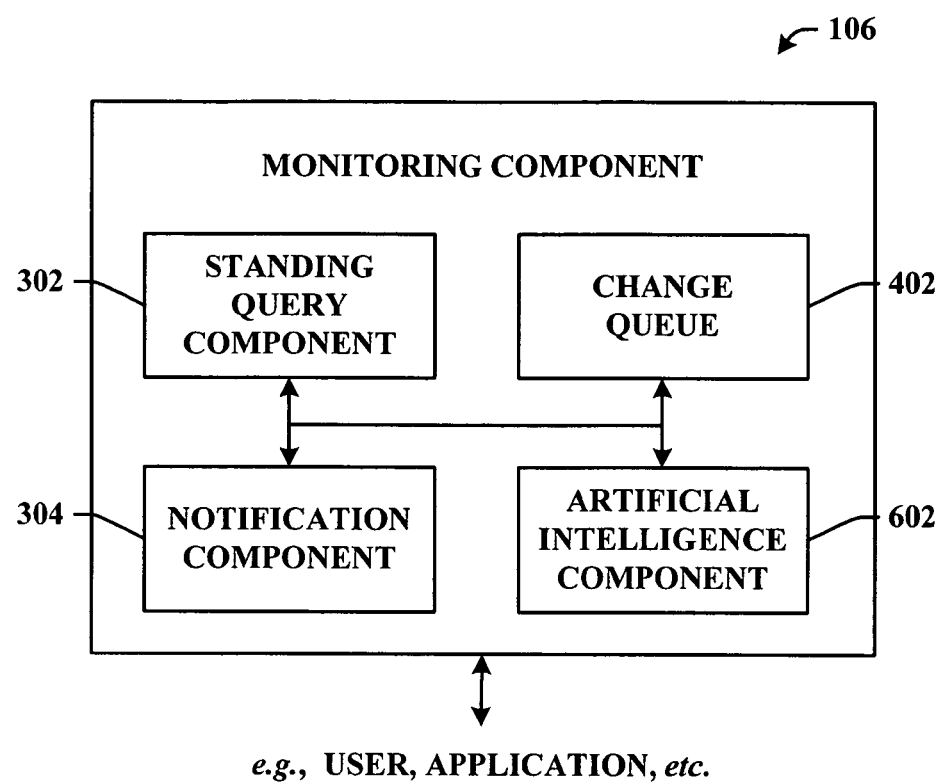
FIG. 6 illustrates a general component block diagram of an alternative monitoring component that employs an artificial intelligence-based reasoning in accordance with an aspect of the subject invention.

A schematic diagram of another alternative aspect of the monitoring component 106 is illustrated in FIG. 6. In addition to or in place of the rule-based logic component described with reference to FIG. 5, the monitoring component 106 can include an artificial intelligence (AI) engine component 602.

In accordance with this aspect, the optional AI engine component 602 can facilitate automatically configuring and/or implementing various aspects of the monitoring component 106. The AI component 602 can optionally include an inference component (not shown) that can further enhance automated aspects of the AI components utilizing, in part, inference based schemes to facilitate inferring intended actions to be performed at a given time and state. The AI-based aspects of the invention can be effected via any suitable machine-learning based technique and/or statistical-based techniques and/or probabilistic-based techniques.

In the alternate aspect, as further illustrated by FIG. 6, the monitoring component 106 (e.g., in connection with defining criteria and/or parameters, filtering results) can optionally employ various artificial intelligence based schemes for automatically carrying out various aspects thereof. Specifically, an AI engine component 602 can optionally be provided to implement aspects of the subject invention based upon AI processes (e.g., confidence, inference). For example, a process for defining a standing query component 302, which interrogates content of a repository, can be facilitated via an automatic classifier system and process. Further, the optional AI component 602 can be employed to facilitate an automated process of creating and designating a standing query in accordance with historical user trends whereby data files corresponding to a specific set of criteria can be identified and presented to a user.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of standing query creation and designation, for example, attributes can be file types or other data-specific attributes derived from the file types and/or contents, and the classes can be categories or areas of interest.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the invention can employ classifiers that are explicitly trained (e.g., via a generic training data) as well as implicitly trained (e.g., via observing user behavior, receiving extrinsic information). For example, SVM's can be configured via a learning or training phase within a classifier constructor and feature selection module. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

Other implementations of AI could include alternative aspects whereby based upon a learned or predicted user intention, the system can generate hierarchical notifications and/or prompts. Likewise, an optional AI component could generate multiple prompts to a single and/or group of users based upon the received content.

Figure 7:
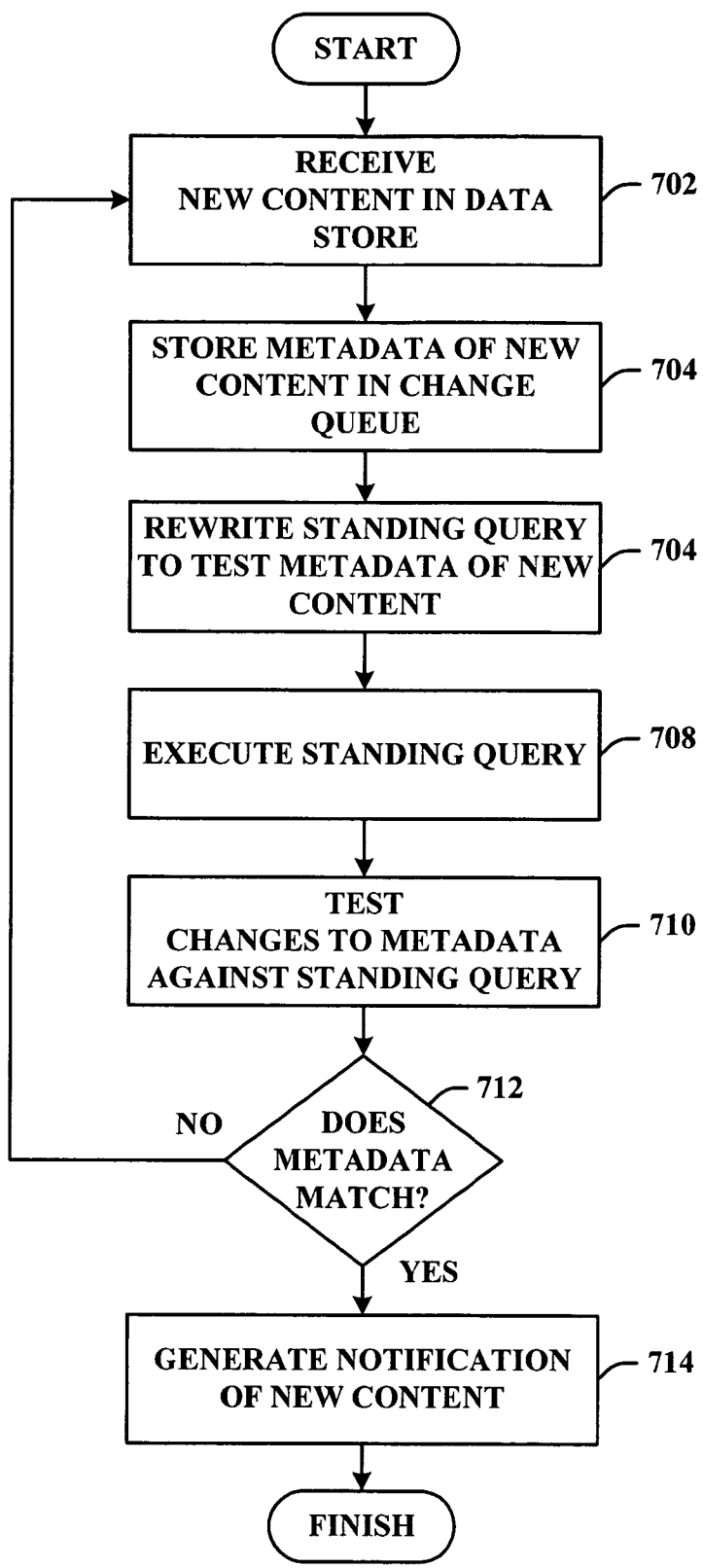
FIG. 7 illustrates an exemplary flow chart of procedures to test metadata and to generate an appropriate notification in accordance with a disclosed aspect.

FIG. 7 illustrates a flow chart of a methodology that facilitates detection of new content. At 702, new (or modified) content is received in a data store (e.g., repository). The metadata of the new content is extracted and stored in a change queue at 704. It will be appreciated that the change queue can be any data storage device known in the art. For example, the metadata can be cached, buffered, stored or the like. In order to test the metadata of the new content, which is maintained in the change queue, the standing query is rewritten at 706. In operation, the standing query is rewritten to interrogate the metadata maintained in the change queue. At 708, the standing query is executed.

Changes to the metadata are tested against the standing query at 710. A determination is made at 712 to establish if the standing query matches any of the newly received content metadata in the change queue. If the standing query does not match any of the metadata the process returns to 702 and the system waits for new content to be received. If a determination is made that the standing query matches the new metadata, at 714, a notification is generated to prompt of new content. It will be appreciated that the process illustrated by the flow diagram of FIG. 7 can be repeated once notification is generated. In other words, once notification is effected to identify that new content had been received, the process can return to 702 to wait for additional new content.

Figure 8:
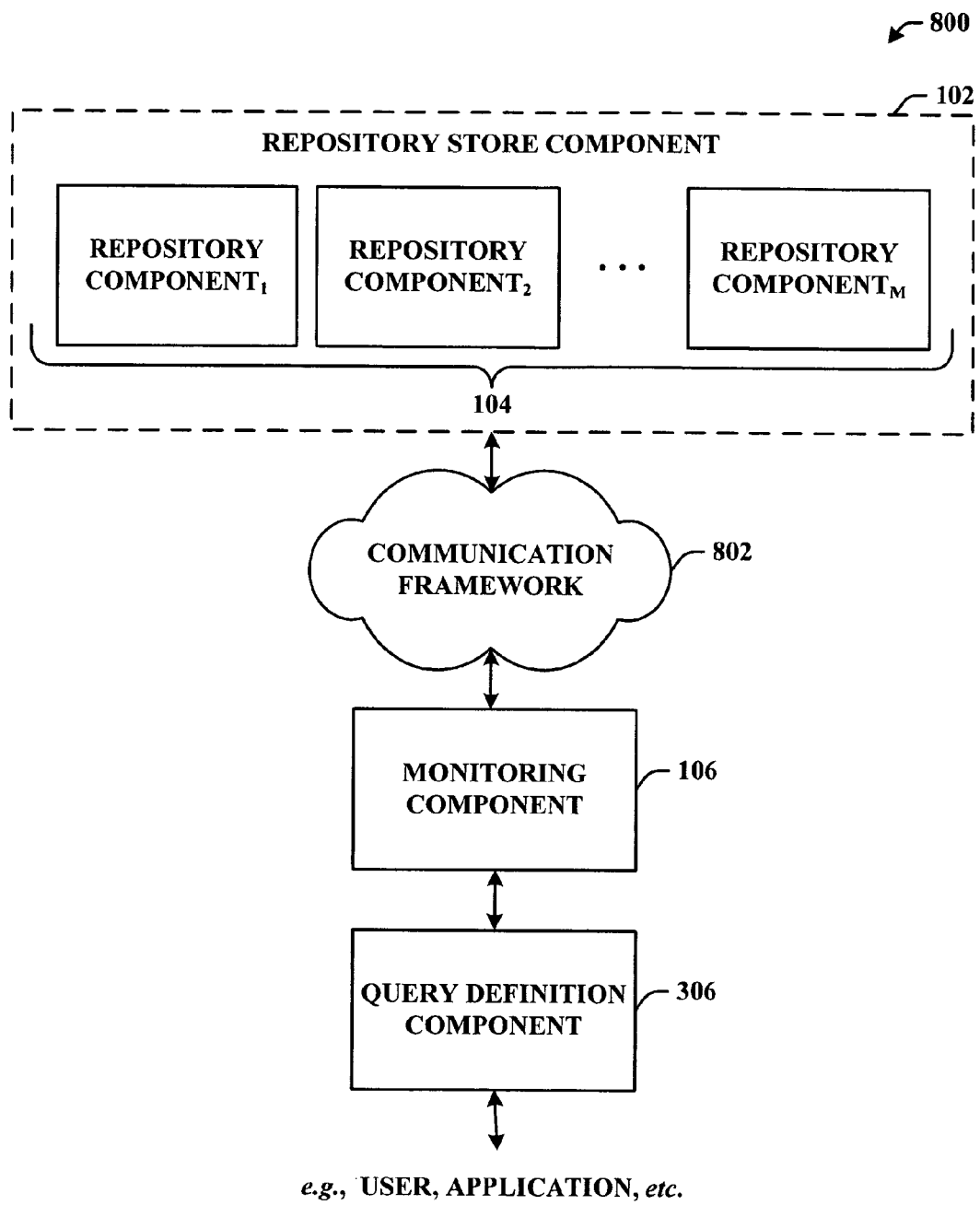
FIG. 8 illustrates a component diagram of an exemplary computing environment in accordance with an aspect of the subject invention.

Referring to FIG. 8, a schematic block diagram of an exemplary computing environment is shown in accordance with an aspect of the subject invention. Specifically, the system 800 illustrated includes a repository store component 102 having repository components 104 contained therein. Further, the system 800 includes a monitoring component 106 and a query definition component 306. These components can have the same functionality as discussed in detail supra with reference to FIG. 1. Additionally, the system 800 illustrated employs a communication framework 802 whereby the repository store component 102 can be located remotely from the monitoring component 106 and/or the query definition component 306. It is to be appreciated that communications framework 802 can employ any communications technique (wired and/or wireless) known in the art. For example, communications framework 802 can include, but is not limited to, Bluetooth™, Infrared (IR), Wi-Fi, Ethernet, or the like.

Figure 9:
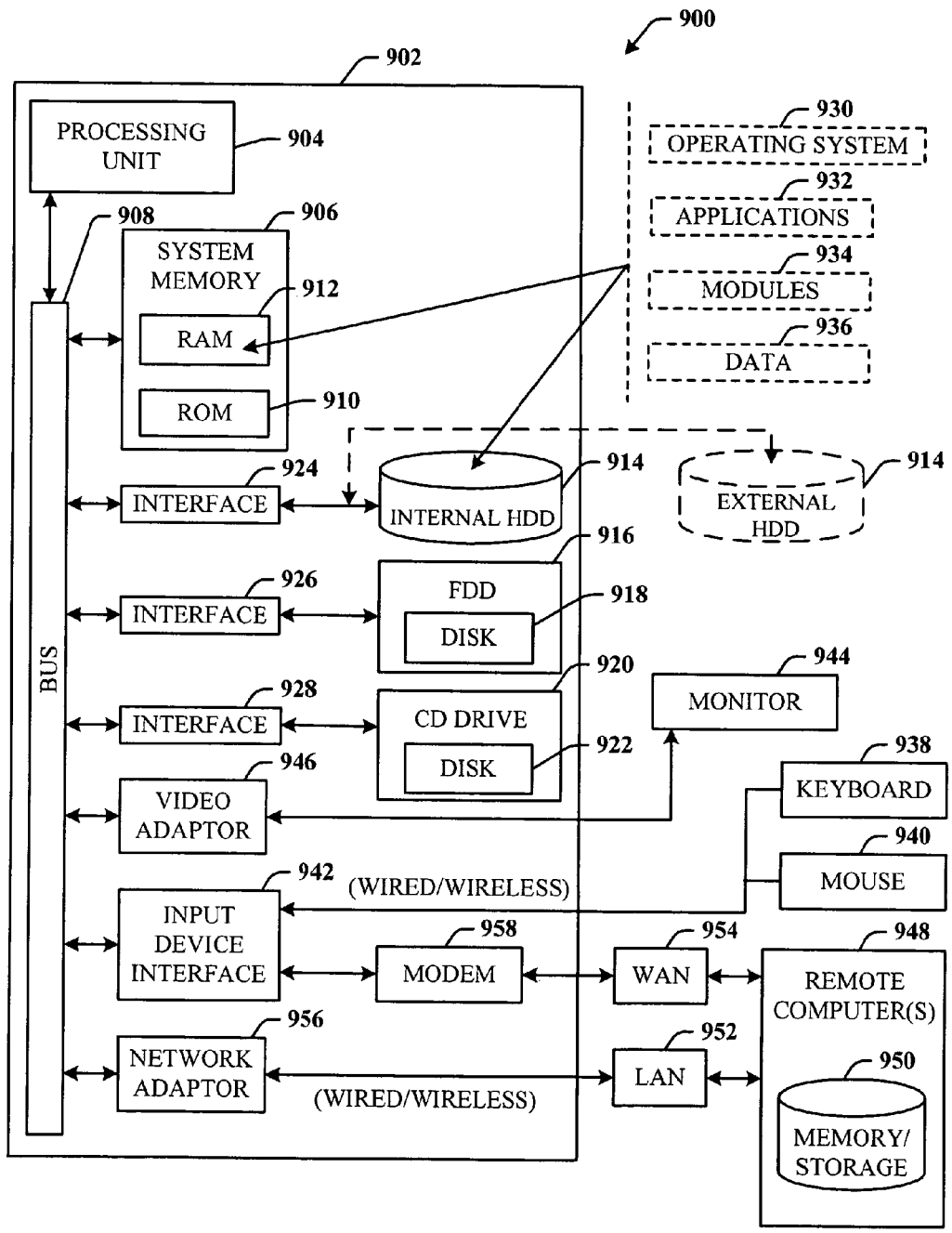
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject invention, FIG. 9 and the following discussion are intended to provide a brief, general description of a suitable computing environment 900 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an exemplary environment 900 for implementing various aspects of the invention that includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the subject invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956. When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
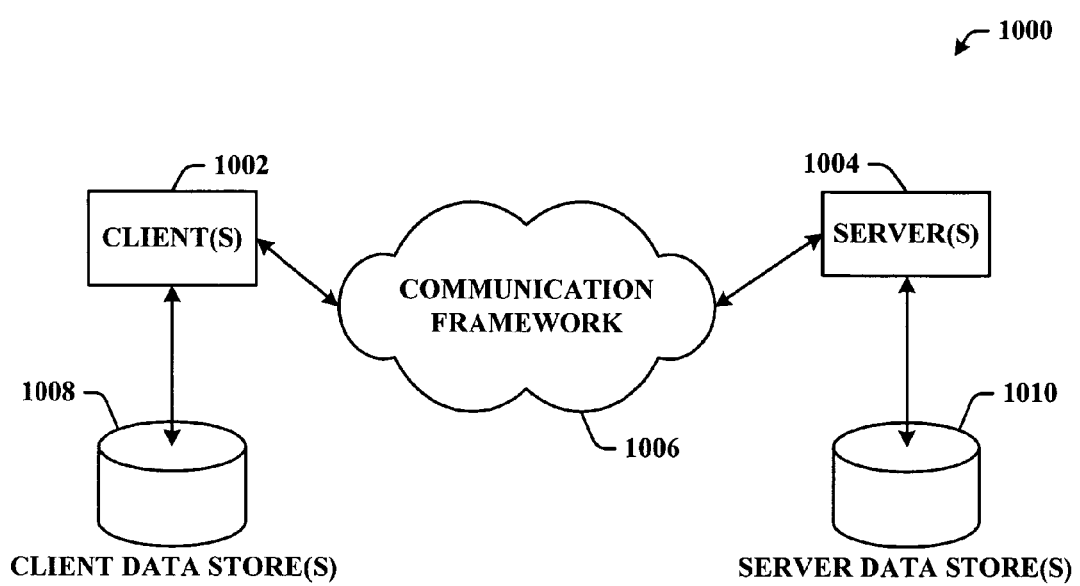
FIG. 10 illustrates a schematic block diagram of an exemplary computing environment in accordance with the subject invention.

Referring now to FIG. 10, there is illustrated a schematic block diagram of an exemplary computing environment 1000 in accordance with the subject invention. The system 1000 includes one or more client(s) 1002. The client(s) 1002 can be hardware and/or software (e.g., threads, processes, computing devices). The client(s) 1002 can house cookie(s) and/or associated contextual information by employing the subject invention, for example. The system 1000 also includes one or more server(s) 1004. The server(s) 1004 can also be hardware and/or software (e.g., threads, processes, computing devices). The servers 1004 can house threads to perform transformations by employing the subject invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates tracking content of a plurality of repositories, the system comprising:
   one or more processors;
   one or more memories having stored thereupon a plurality of processor-executable instructions that, when executed by the one or more processors, cause the one or more processors to perform actions comprising:
      monitoring imported metadata that corresponds to content received into the plurality of repositories to determine that a change occurs with respect to the content;
      executing a query that monitors the plurality of repositories for metadata that indicates the change with respect to the content; and
      defining the query based on a hardware limitation of a computing device, the defining including sending a command to omit a notification of the change with respect to the content in response to determining that new content associated with the change has a characteristic that exceeds the hardware limitation of the computing device.

2. The system of claim 1, wherein the actions further comprise maintaining the imported metadata.

3. The system of claim 1, wherein the hardware limitation is a memory capacity or a storage capacity of the computing device.

4. The system of claim 1, wherein the actions further comprise conditionally generating an alert of the change based at least on the imported metadata matching the query.

5. The system of claim 4, wherein the actions further comprise providing a user interface including a notification panel that receives the alert.

6. The system of claim 5, wherein the actions further comprise designating the query as a standing query based at least partly on receiving an icon that represents the query at the notification panel of the user interface.

7. The system of claim 4, wherein the alert is a visual alert.

8. The system of claim 4, wherein the alert is an audible alert.

9. The system of claim 1, wherein the actions further comprise indicating a level of confidence that the query is in accordance with a user intention based at least in part on at least one of probabilistic, statistic, or regression based analysis.

10. A computer-implemented method comprising:
defining a query as an important query that monitors at least one of a plurality of disparate repositories for metadata associated with new content, the query being defined based at least in part on a predicted user intention generated by artificial intelligence, and the plurality of disparate repositories including one or more repositories that are each associated with one of local file stores, shared file stores, or websites;
assigning a value that indicates a level of confidence that the predicted user intention is in accordance with an actual user intention based at least in part on an automatic classifier function that employs at least one of probabilistic, statistic, or regression based analysis;
storing metadata that corresponds to the new content;
executing the query to identify the metadata; and
generating a notification upon identification of the metadata.

11. The method of claim 10, further comprising adding the query to a notification panel of a graphical user interface.

12. The method of claim 10, further comprising designating the query as a standing query.

13. The method of claim 12, further comprising storing the metadata in a change queue.

14. The method of claim 10, wherein the defining the query further comprises employing at least one of rule-based logic, probabilistic, statistical, or regression based analysis to automatically define the query.

15. A computer-implemented method comprising:
providing a user interface that enables a user to define a query;
detecting a dragging of an icon that represents the query onto a notification panel at the user interface;
designating the query as an important query that monitors at least one of a plurality of disparate repositories, the plurality of disparate repositories including one or more repositories each associated with one of local file stores, shared file stores, or websites;
displaying via the user interface a first indication in response to determining that the important query has identified metadata that corresponds to new content and that the new content is received by a first software application for storage in the plurality of disparate repositories; and
displaying via the user interface a second indication in response to determining that the important query has identified metadata that corresponds to the new content and that the new content is received by a second software application for storage in the plurality of disparate repositories, the first software application being different from the second software application.

16. The method of claim 15, wherein the user interface displays the query via the notification panel.

17. The method of claim 16, further comprising:
rewriting the query automatically using artificial intelligence in accordance with at least one of a predefined rule or a predicted user intention; and
executing the query as rewritten by the artificial intelligence to monitor the plurality of disparate repositories to detect a change to the content of the one or more repositories.

18. The method of claim 15, further comprising providing an alert of a change to content of the one or more repositories.

19. The method of claim 18, wherein the alert is a visual alert.

20. The method of claim 18, wherein the alert is an audible alert.

* * * * *